April 4, 1967 J. G. HAWLEY ETAL 3,312,317
AUTOMATIC BRAKE ADJUSTMENT WITH HYDRAULIC RESET DEVICE
Filed Jan. 28, 1965
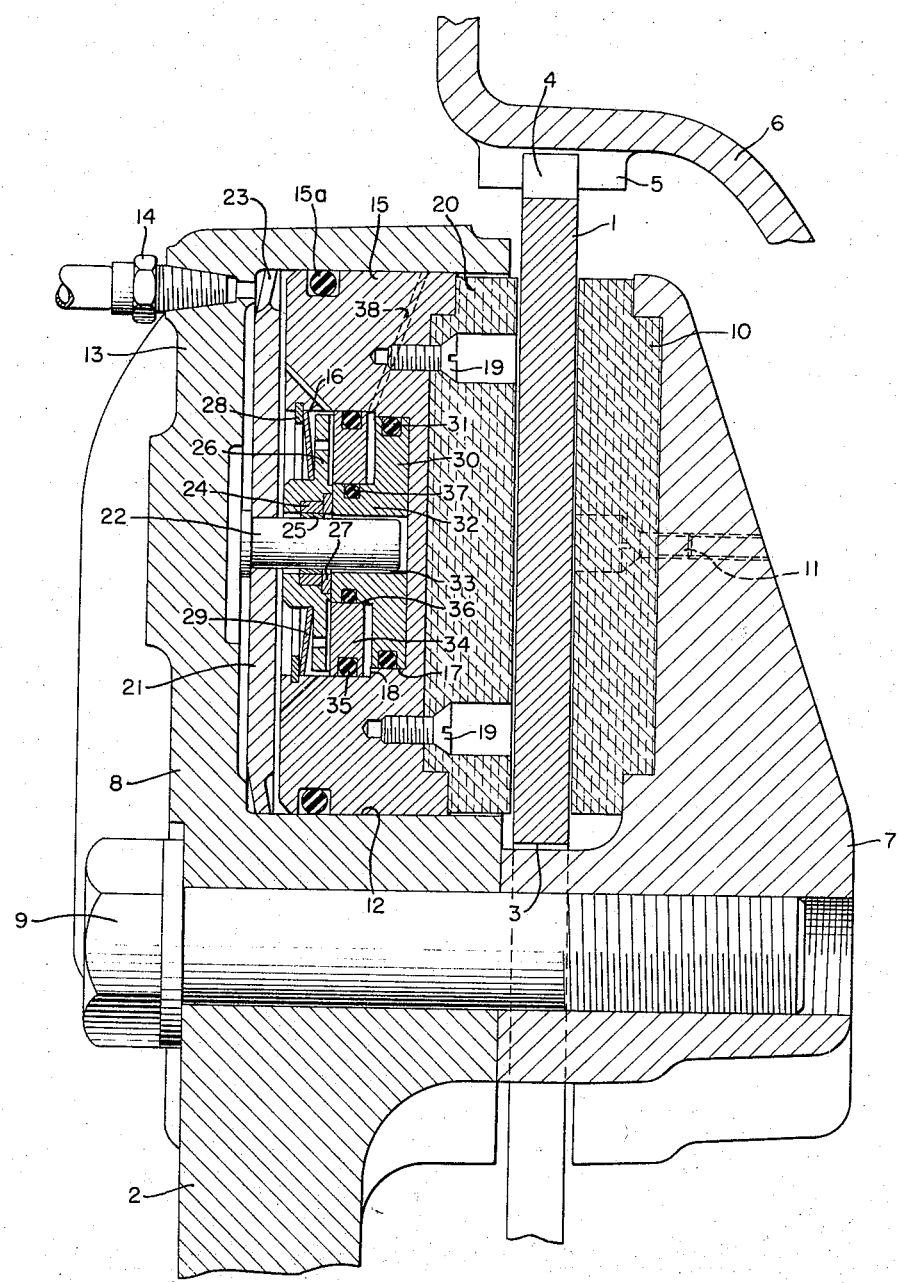
INVENTORS
JESSE G. HAWLEY
BY ALBERT W. COOK
CARL E. BRICKER
J.B. Holden
ATTORNEY

United States Patent Office 3,312,317
Patented Apr. 4, 1967

3,312,317
AUTOMATIC BRAKE ADJUSTMENT WITH HYDRAULIC RESET DEVICE
Jesse G. Hawley, Penn Yan, N.Y., and Albert W. Cook, Tallmadge, and Carl E. Bricker, Cuyahoga Falls, Ohio, assignors to The Goodyear Tire & Rubber Company, Akron, Ohio, a corporation of Ohio
Filed Jan. 28, 1965, Ser. No. 428,818
4 Claims. (Cl. 188—196)

This invention relates to automatic adjustment means for compensating for lining wear in brakes, and, more particularly, is concerned with mechanisms of this type, but adapted to function even though housing or other deflections occur between the brake members upon brake application.

It is the general object of the invention to provide an improved automatic adjustment for brakes as lining wear occurs so that constant brake clearances can be maintained, and wherein constant brake clearances are maintained even though housing deflections result, linings swell, or other movements between brake members occur upon the application of the braking forces.

Another object of the invention is the provision of wear compensating means in brakes wherein the means are characterized by simplicity of design, low initial cost, and long life with little or no maintenance.

Another object of the invention is to provide a brake combination wherein no loss of brake pedal stroke results as the friction means of the brake wear off in use.

Another object of the invention is the provision of a braking combination wherein desired brake clearances are automatically established upon brake application and release even though the brake has been assembled without proper clearance, and with proper clearances being maintained throughout the life of the friction members of the brake even though housing deflection occurs upon the application of the brake in an amount up to or greater than the brake clearance.

The foregoing objects of the invention, and other objects which will become apparent as the description proceeds, are achieved by the combination in a brake of a stationary member, and a movable member, friction means carried by one member and movable to and from braking relation with the other, hydraulic means for effecting braking movement, spring means for returning the friction means to a non-braking clearance upon release of the hydraulic means, a stop against which the spring means engage, means carried with the friction means to reposition the stop upon wear of the friction means and upon deflection of any member resulting from the forces of the hydraulic means in an amount exceeding non-braking clearance, and reset piston means in the hydraulic means for returning the stop any distance caused by deflection of any member.

For a better understanding of the invention, reference should be had to the accompanying drawing wherein the singe figure is a radially and axially directed cross sectional view of a spot-type single disc brake incorporating the principles of the invention.

The invention is broadly applicable to brakes of various types, but for purposes of illustration have been shown in conjunction with a single disc brake having buttons of friction material pressed against opposite sides of the disc to effect the braking action.

In the drawing, the brake includes a rotary member 1 and a stationary member 2. The rotary member 1 is in the form of a metal disc having an aperture 3 at its center and splines 4 at its outer periphery. The splines 4 engage with keys 5 carried on the underside of a wheel 6 so that the disc 1 is rotated with the wheel but is free to move axially in relation to the wheel. The wheel 6 is journalled upon an axle, not shown, to which the stationary brake member 2 is secured. The stationary brake member 2 is in the form of a C-shaped housing having an anvil portion 7 and a cylinder portion 8 which are secured together by means of cap screws 9 extending through the aperture 3 in the disc 1 so that the housing straddles the disc 1 in the manner illustrated. The anvil portion 7 of the housing carries a block or button of friction material 10 held to the anvil portion 7 by fastening means 11 so that the block of friction material 10 engages with one side of the disc 1 upon the application of the brake.

The cylinder portion 8 of the housing has a cylindrical bore 12 open at its end towards the disc 1 and closed at its other end by an integral wall 13 which carries a hydraulic fitting 14 through which hydraulic fluid under pressure can be supplied in any of the usual ways to the cylindrical bore.

Slidably received in the cylindrical bore 12 is a piston 15 carrying means 15a sealing with the cylindrical bore. The piston 15 is cup-shaped having a cup-like opening 16 therein provided with a counterbore 17 forming a shoulder 18. Secured by suitable fastening means 19 to the outside of the bottom of the cup-shaped piston 15, that is to the disc side of the piston, is a block of or button of friction material 20 which is adapted to engage with the side of the disc 1 opposite the friction material 10.

Coming now to the automatic adjustment means, this is built as a substantially self-contained unit which can simply be pressed into position in the cylindrical bore 12 of the portion 8 of the housing. More specifically, the automatic adjustment means includes a round flat plate 21 having secured thereto in an axially extending direction a pin 22 which is directed into the cup of the piston 15. The plate 21 is slotted to form fingers 23 at several points about its periphery so that the plate 21 and the pin 22 carried thereby can simply be dropped into the cylindrical bore 12 and down to the bottom thereof to position the plate 21 closely adjacent the housing wall 13 with the plate being held in this position by plastically deforming fingers 23 into firm engaging with the side walls of the cylindrical bore 12. The slots in the plate 21 allow hydraulic fluid passing in through the fitting 14 to get past the plate 21 and behind the piston 15. The use of plate 21 carrying pin 22 allows brake structures already in the field to be provided with the improved means of the present invention. If the invention is built into a new brake the pin 22 can be directly secured to housing wall 13 and plate 21 eliminated.

The pin 22 is engaged by a friction grip which takes the form of a split steel ring 24 having a brass or similar liner 25 carried in a cup-disc 26 with a locking washer 27 holding the friction grip 24 radially free in the cup-disc 26. The edges of the holes in cup disc 26 and washer 27 are scalloped to allow fluid to flow along pin 22 but with liner 25 being held against displacement.

The inside lip of the cup-shaped opening 16 in the piston 15 is provided with a split locking or shoulder ring 28, and a flat dish-shaped spring washer 29, such as a Belleville spring washer, is positioned between the ring 28 and the cup-disc 26. It will be seen that spring means 29 acting between the friction grip 24 and the piston 15 thus serve to resiliently hold the piston 15 in its non-braking or clearance position.

Included in the automatic adjustment mechanism is a reset piston 30 positioned at the bottom of the cup of the piston 15, the reset piston having means 31 sealing between its outer periphery and the counterbore 17 of the piston 15. Also, the reset piston 30 has an axial cylindrical boss 32 extending into engagement with the cup disc 26 carrying the friction grip 24, with the reset piston being centrally apertured at 33 to slide freely over the pin 22.

It is evident that when hydraulic fluid under pressure is applied through the fitting 14 to the cup side, i.e., the left hand side of the piston 15, that the pressure of the fluid is likewise applied to the right hand side of the reset piston 30. However, the left hand side of the reset piston 30 is at all times subjected only to atmospheric pressure, and this is achieved in the embodiment of the invention illustrated by providing a disc-piston 34 which fits down against the shoulder 18 in the cup opening 16 with sealing means 35 sealing the outer periphery of the disc piston 34 with the wall of the cup 16. The disc piston 34 is centrally apertured to provide a cylindrical wall 36 which slidably receives the boss 32 of the reset piston 30, with sealing means 37 therebetween. The piston 15 is formed with a vent passage 38 from the left side of the reset piston 30 to the atmosphere so that at all times by the combination illustrated and described, substantially atmospheric pressure only is maintained behind or to the left of the reset piston 30.

In the assembly of the automatic adjustment mechanism described, this can all be assembled together and positioned in the cup 16 of the piston 15 with the piston 15 then being pushed into the cylindrical bore 12 of the housing 8 over the pin 22 held by plate 21 already in place as previously described. Thus, the entire automatic adjustment mechanism is positioned in the cylindrical bore with all parts substantially in position shown in the drawing.

In the operation of the apparatus of the invention, three conditions will be considered. First will be considered an operation in which there is no deflection in the housing 7, 8 and 9 of the brake in use and there is no appreciable wear of the friction materials 10 and 20. In this example, hydraulic pressure applied to the fitting 14 to the left of the piston 15 moves the piston 15 to the right to engage the friction material 20 with the disc 1 and to in turn press the other side of the disc 1 against the friction material 10. The Belleville spring washer 29 yields during this movement of the piston 15 to allow the brake clearance to be taken up and the brake applied within the yielding movement of the spring washer 29, and without any movement of the grip 24 in relation to the pin 22. Upon release of the hydraulic pressure, the spring means 29 moves the piston 15 to the left to re-establish normal clearances between the friction materials 10 and 20 and the disc 1. It will be understood that braking clearances are normally kept small so that the major portion of any brake pedal stroke can be used to apply the brake rather than to take up brake clearances.

In the second condition of automatic adjustment operation, it will be assumed that there is no housing deflection, but that wear of the friction materials 10 and 20 has occurred. In this event, the shoulder ring 28 will bottom the spring 29 against the cup-disc 26 before the brake is fully applied and this will cause the cup-disc 26 and grip 24 to be picked up by the piston 15 and moved slightly to the right on the pin 22 to compensate for the wear of the friction materials 10 and 20. Upon brake release, the spring washer 29 will re-establish brake clearance by moving the piston 15 to the left. The limit of this movement, of course, is when the inside bottom of the cup 16 of the piston 15 engages with the righthand side of the reset piston 30, and with the boss portion 32 of this piston engaging with the righthand side of the cup-disc 26 carrying the friction grip 24. Thus, under this second condition of operation, the friction grip would be periodically moved to the right as lining wear occurs each time re-establishing brake operating clearance upon brake release.

In both conditions one and two described, the hydraulic pressure applied to the lefthand side of the piston 15 also gets on the righthand side of the reset piston 30 but the lefthand side area of the piston 15 is so much greater than the righthand area of the reset piston 30, that the reset piston 30 performs no function in the two conditions of operation described.

However, now we come to a third condition of operation, which must be carefully considered. In actual practice, conditions one and two described above, occur only in brake operation when relatively low hydraulic operating pressures are utilized. Reference is made to brake operating pressures below 200 p.s.i. With pressures of this type, little or no housing deflections occur which are troublesome. But if a braking system is restricted to operating pressures of this type, the braking units must be built relatively large if desired braking torques are to be achieved. It becomes more practical from a weight, cost and size standpoint to use much higher brake operating pressures, usually from 400 to 600 p.s.i., but sometimes as high as 1500 p.s.i. Panic stops, also, temporarily generate high brake pressures.

Now when brake operating pressures in the higher ranges are utilized with smaller and lighter brake housings, desired and necessary braking torques can be obtained but housing deflection results. It can be safely said that in actual practice, particularly with respect to foot operated brakes for airplanes, that conditions one and two of operation as described above never occur upon application of full brake pressure. There occurs, instead, an action which now will be described, and this action can perhaps be best understood by assuming for a moment that a greater than actual housing deflection results. For example, when hydraulic pressure of 600 lbs. is supplied to the lefthand side of the piston 15, the cap screws 9 deflect as does the anvil portion 7 of the housing and it is necessary to move the piston 15 a quarter of an inch to the right before the full 600 lbs. hydraulic pressure on the lefthand side of the piston is absorbed by the housing. (Remember that this is an exaggeration for illustration only, actually housing deflections are much less.) This movement of the piston 15 to the right will pick up the cup-disc 26 and the friction grip 24 and will move it a considerable distance to the right on the pin 22. During the pick-up and repositioning of the grip 24, the spring 29 has bottomed, as previously described under condition two. The brake operating pressure has penetrated to the righthand side of the reset piston 30, the inside of the cup of the piston 15 moving away to the right from the righthand side of the reset piston 30 as the Belleville spring 29 bottoms.

Now the brake operator releases his foot from the brake pedal. Immediately the deflections of the brake housing endeavor to remove themselves and these act faster than the operator can remove the pressure from the brake pedal and on the left side of the piston 15. The housing deflection operating back from the friction material 10 through the disc 1 and the friction material 20 against the righthand side of the piston 15 maintains a sufficiently high fluid pressure on the righthand side of the reset piston 30 (with atmospheric pressure only on the left of the reset piston 30) so that it acts to move the cup-disc 26 and the friction grip 24 to the left on the pin 22 until substantially all of the deflections are out of the housing. During this return movement of the friction grip 24 by the reset piston 30, the pressure on the lefthand side of the piston 15 has dropped as the hydraulic fluid escapes back up through the fitting 14 to the master cylinder, but with the pressure on the lefthand side of the piston still being high enough so that the spring 29 is still bottomed. It is only after the grip 24 has been returned to or substantially returned to its original position on the pin 22, and all or substantially all of the housing deflection has been removed, that the pressure to the left of the piston 15 drops below that required to keep the spring 29 bottomed whereupon the spring 29 functions to effect the final movement of the piston 15 to the left to re-establish the braking clearance.

This third condition of operation is the one which actually results in the usual brake assembly. In order to make the operation more understandable, the condition of housing deflection has been exaggerated. In actual use, the housing deflections can be kept small, but usually they cannot be kept within the relatively small limits of desired brake clearance. Hence, in actual use of the mechanism of the invention as described, there is a movement to the right of the grip 24 upon each application of the brake, this movement resulting from housing deflection. There is also a movement back to the left of the gripping means under the action of the reset piston 30 upon brake release. If the reset piston 30 were not utilized and the grip 24 were allowed to remain in the position to where it had been moved by housing deflection, then there would be upon brake release a very considerable and highly objectionable brake drag.

It will be recognized that in the actual use of the mechanism of the invention that normally a combination of condition three and condition two results with the friction grip 24 never being returned by the reset piston 30 fully back to its position before brake operation. Thus, lining wear is compensated for and the same brake clearance maintained over the entire life of the friction materials 10 and 20.

One of the features of the mechanism of the invention is that even though the brake clearance should not be properly adjusted when the brake is first assembled, that the desired clearance will be established upon the first operation of the brake. For example, a housing having a maximum manufacturing tolerance as to the gap between the friction materials 10 and 20 could be used with a disc 1 having a minimum manufacturing tolerance thickness, or a maximum thickness disc could be used with a minimum tolerance housing with different clearance conditions resulting. However, after the first brake application, the clearance between the shoulder ring 28 and the cup-disc 26 as shown in the drawing and the condition when the spring 29 bottoms will be established in the brake after its first operation.

It may also be stated that the invention provides for a mechanism of the type described wherein instead of having a fixed pin and a grip movable along the pin, just the reverse can be used, namely, a fixed grip and a movable pin whose relation with the fixed grip is changed, all as herein described.

One of the advantages of the invention is that the compensating mechanism is provided without loss of effective piston area, so that full braking force over the piston is obtained.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a brake of a rotatable disc, a fixed housing straddling a portion of the disc, an anvil portion of the housing, a block of friction material carried by the anvil portion and adapted to engage one side of the disc, a cylinder portion of the housing, a cup-shaped piston slidable in the cylinder portion, a block of friction material on the outside of the bottom of the cup of the piston and engageable with the other side of the disc, a pin fixed to the housing and extending axially into the cup of the piston, a friction grip on the pin, a shoulder-forming ring on the inside of the lip of the cup in the piston, a flat dish-shaped compression spring between the grip and the ring to return the piston and its friction material to a clearance position with the disc, a disc-like piston positioned in the cup of the piston between the friction-grip and a shoulder in the cup of the piston, means sealing the periphery of the disc-like piston in relation to the cup of the piston, the disc-like piston being centrally apertured to provide a cylindrical wall spaced from the pin, a reset piston axially apertured to receive and loosely slide on the pin, one end of the reset piston engaging with the bottom of the cup of the piston, an integral, axial, cylindrical boss on the other side of the reset piston extending into engagement with the friction grip, means sealing between the periphery of the reset piston and the inside of the cup of the piston, means sealing between the boss and the cylindrical wall of the disc-like piston, the piston having a vent to atmosphere from the boss side of the reset piston, and means for supplying hydraulic fluid under pressure to the cup-side of the piston to apply the brake.

2. The combination in a brake of a rotatable disc, a fixed housing straddling a portion of the disc, an anvil portion of the housing, a block of friction material carried by the anvil portion and adapted to engage one side of the disc, a cylinder portion of the housing, a cup-shaped piston slidable in the cylinder portion, a block of friction material on the outside of the bottom of the cup of the piston and engageable with the other side of the disc, a pin fixed to the housing and extending axially into the cup of the piston, a friction grip on the pin, means for supplying hydraulic fluid under pressure to the cup side of the piston to apply the brake, shoulder means on the cup of the piston, metal spring means between the friction grip and shoulder means and acting to re-establish clearance in the brake upon release of hydraulic pressure, but with the shoulder means engaging with the friction grip through the spring means to reposition the grip on the pin in the event of housing deflection or lining wear in excess of brake clearance upon application of hydraulic pressure, a reset piston slidably sealed in the cup of the piston, loosely surrounding the pin and engaging with the grip for returning the grip any portion of its movement caused by housing deflection, and means for maintaining atmospheric pressure at the side of the reset piston remote from the bottom of the cup of the piston.

3. The combination in a brake of a rotatable disc, a fixed housing straddling a portion of the disc, an anvil portion of the housing, a block of friction material carried by the anvil portion and adapted to engage one side of the disc, a cylinder portion of the housing, a cup-shaped piston slidable in the cylinder portion, a block of friction material on the outside of the bottom of the cup of the piston and engageable with the other side of the disc, a pin fixed to the housing and extending axially into the cup of the piston, a friction grip on the pin, means for applying hydraulic pressure to the cup side of the piston to apply the brake, spring means between the piston and grip to return the piston to brake clearance position upon release of the hydraulic pressure, means carried by the piston to reposition the grip on the pin upon wear of the friction material and housing deflection in an amount exceeding brake clearance, reset piston means in the cup of the piston engaging with the grip, said reset piston means being exposed at one side to the hydraulic pressure to return the grip any distance caused by housing deflection, and means maintaining atmospheric pressure on the other side of the reset piston means.

4. The combination in a brake of a rotatable disc, a fixed housing straddling a portion of the disc, an anvil portion of the housing, a block of friction material carried by the anvil portion and adapted to engage one side of the disc, a cylinder portion of the housing, a cup-shaped piston slidable in the cylinder portion, a block of friction material on the outside of the bottom of the cup of the piston and engageable with the other side of the disc, mounting means fixed to the housing and extending into the cup of the piston, a friction grip positioned on said mounting means, means for applying hydraulic pressure to the cup side of the piston to apply the brake, spring means between the piston and grip to return the piston to brake clearance position upon release of the hydraulic pressure, reset piston means in the cup of the piston engaging with the grip, said reset piston means being exposed at one side to the hydraulic pressure to return the grip any distance caused by housing deflection, and means maintaining atmospheric pressure on the other side of the reset piston means.

References Cited by the Examiner

UNITED STATES PATENTS

| | | | |
|---|---|---|---|
| 3,064,768 | 11/1962 | Dotto | 188—196 X |
| 3,186,521 | 6/1965 | Chouings | 188—72 X |
| 3,255,846 | 6/1966 | Livezey | 188—72 |

DUANE A. REGER, *Primary Examiner.*